United States Patent
Ewers et al.

(10) Patent No.: US 9,829,061 B2
(45) Date of Patent: Nov. 28, 2017

(54) VALVE ARRANGEMENT

(71) Applicant: Öhlins Racing AB, Uplands Väsby (SE)

(72) Inventors: Benny Ewers, Vetlanda (SE); Simon Ivarsson, Jönköping (SE); Fredrik Larsson, Jönköping (SE)

(73) Assignee: ÖHLINS RACING AB, Uplands Väsby (SE)

( * ) Notice: Subject to any disclaimer, the term of this patent is extended or adjusted under 35 U.S.C. 154(b) by 245 days.

(21) Appl. No.: 14/784,223

(22) PCT Filed: Apr. 15, 2014

(86) PCT No.: PCT/EP2014/057578
§ 371 (c)(1),
(2) Date: Oct. 13, 2015

(87) PCT Pub. No.: WO2014/170304
PCT Pub. Date: Oct. 23, 2014

(65) Prior Publication Data
US 2016/0076616 A1    Mar. 17, 2016

(30) Foreign Application Priority Data

Apr. 16, 2013 (EP) .................................... 13163977

(51) Int. Cl.
*F16F 9/44* (2006.01)
*F16F 9/46* (2006.01)

(52) U.S. Cl.
CPC .............. *F16F 9/464* (2013.01); *F16F 9/465* (2013.01)

(58) Field of Classification Search
CPC .......... F16F 9/464; F16F 9/465; F16F 9/3482; F16K 31/1221; Y10T 137/7764
USPC ...................................... 188/322.13; 137/489
See application file for complete search history.

(56) References Cited

U.S. PATENT DOCUMENTS

| 5,934,421 A | 8/1999 | Nakadate et al. |
| 2010/0155633 A1* | 6/2010 | Pfaff .................... F15B 13/0405 251/30.02 |

FOREIGN PATENT DOCUMENTS

| CN | 102207156 | 10/2011 |
| CN | 102878236 | 1/2013 |
| CN | 102979846 | 3/2013 |

(Continued)

*Primary Examiner* — Mary McManmon
*Assistant Examiner* — Nicole Gardner
(74) *Attorney, Agent, or Firm* — Kagan Binder, PLLC

(57) ABSTRACT

A valve arrangement comprising a main valve member being axially movably arranged in a valve housing and arranged to interact with a main valve seat of the valve housing in order to restrict or regulate a pressure in a main fluid flow in response to a pilot pressure acting on the main valve member. A control valve member is axially movable within the main valve member in response to an actuating force acting on the control valve member. A pilot valve member is axially movable within the control valve member, and is arranged to interact with a pilot valve seat of the control valve member to restrict a pilot fluid flow out from a pilot chamber. The pilot valve member is resiliently loaded towards the pilot valve seat relative the main valve member or the valve housing, such that the resilient loading on the pilot valve member is adjustable in response to the actuating force.

22 Claims, 12 Drawing Sheets

(56) References Cited

FOREIGN PATENT DOCUMENTS

DE       4137403 A1    5/1993
WO       91/16556      10/1991

* cited by examiner

VALVE ARRANGEMENT

CROSS-REFERENCE TO RELATED APPLICATIONS

This application claims priority to International Application No. PCT/EP2014/057578, filed Apr. 15, 2014, and titled "VALVE ARRANGEMENT", which in turn claims priority from European Application having serial number 13163977.5, filed on Apr. 16, 2013, both of which are incorporated herein by reference in their entireties.

TECHNICAL FIELD OF THE INVENTION

The present invention generally relates to the field of valve arrangements. In particular, the present invention relates to a valve arrangement for controlling a flow of damping medium in a shock absorber.

TECHNICAL BACKGROUND

Generally, within the technical field of shock absorbers that include pilot valves, a pressure regulator, i.e. a valve arrangement, is used to control a flow of damping medium between a compression chamber and a rebound chamber during a reciprocal motion of a piston in a damping medium filled chamber of the shock absorber. The piston, via a piston rod, is connected either to a wheel or a chassis, whereas the chamber is connected to one of the wheel or chassis that the piston is not connected to. During a compression stroke the piston moves axially in a direction towards the compression chamber and thereby pressurizes the damping medium in the compression chamber. During a rebound stroke, the piston moves axially towards the rebound chamber, i.e. in the opposite direction, and thereby pressurizes the damping medium in the rebound chamber. In accordance with the function of the shock absorber, the pressurized damping medium needs to be transferred from the pressurized chamber to the other chamber, i.e. from the compression chamber to the rebound chamber or vice versa. The flow of damping medium needs to be controlled to obtain a damping effect of the piston and thus the shock absorber, i.e. to damp relative motion between the wheel and chassis.

The control of the pressure in the flow of damping medium in the shock absorber depends on the pressure created by the pilot valve. Pressure regulators in shock absorbers are usually provided with an axially movable or deflectable valve member, such as a washer, cone or shim that acts against a seat part. The pressure control is achieved by equilibrium or balance of forces, for example equilibrium between a pressure and/or flow force acting on the valve member in one direction and counteracting or opposing forces, such as one or more of a spring force, friction force or pilot pressure force acting on the valve member on the opposite direction. When the piston of the shock absorber moves at a certain speed such that the pressure and/or flow force become greater than the opposing or counteracting forces, the movable valve member is forced to open. Thus, the movable valve member is forced to open at a stroke defined as a function of the flow produced by the pressure acting on the regulating area of the pressure regulator.

Valve arrangements of the pressure regulating type described above may use an electrically controlled pilot valve to control a pilot pressure acting on the axially movable or deflectable valve member. One example of such an arrangement is disclosed in U.S. Pat. No. 5,934,421 where a spool valve arrangement is provided which, by moving the spool according to an electric current supplied to an actuator, directly and electrically adjusts or controls a restriction on a pilot fluid flow out from a pilot chamber. The pilot pressure acts on the deflectable valve member and thus in turn controls the pressure regulating effect on a main flow. The pilot chamber is furthermore in fluid communication with one of the working chambers of the shock absorber such that the pilot fluid flow also constitutes a bypass fluid flow between the working chambers of the shock absorber. A disadvantage with the disclosed arrangement is that the disclosed spool valve geometry only allows relatively small pilot fluid flows out from the pilot chamber. Therefore, the control of the pilot pressure, and consequently the overall control of the damping force, may be delimiting and inadequate, in particular at higher piston or flow speeds. Another disadvantage with the disclosed arrangement is that the, due to the spool valve design, control of the pilot pressure and the restriction on the bypass passage is sensitive to viscosity of the hydraulic fluid and temperature.

SUMMARY OF THE INVENTION

An object of the present invention is to provide an improved valve arrangement with improved control of the flow restriction and damping characteristics. Another object of the present invention is to provide a compact valve arrangement which may be installed in both external and internal (piston-mounted) positions.

These and other objects are achieved by providing a valve arrangement having the features defined in the independent claim. Preferred embodiments are defined in the dependent claims.

According to a first aspect of the present invention, there is provided a valve arrangement for a shock absorber. The valve arrangement comprises a valve housing, a pilot chamber, a main valve member, a control valve member and a pilot valve member. The valve housing comprises a first and a second port. The pilot chamber is in fluid communication with the first and/or second port, wherein a pilot pressure is defined by a hydraulic pressure in the pilot chamber. The main valve member is axially movably arranged in the valve housing and is arranged to interact with a main valve seat of the valve housing in order to restrict or regulate a pressure in a main fluid flow between the first and second ports in response to the pilot pressure acting on the main valve member. The control valve member is axially movable within the main valve member in response to an actuating force acting on the control valve member. The pilot valve member is axially movable within the control valve member, and is arranged to interact with a pilot valve seat of the control valve member to restrict a pilot fluid flow out from the pilot chamber. The pilot valve member is resiliently loaded towards the pilot valve seat relative the main valve member or the valve housing, such that the resilient loading on the pilot valve member (and thereby also the pilot restriction) is adjustable in response to the actuating force.

According to a second aspect of the present invention, there is provided a valve arrangement for a shock absorber. The valve arrangement comprises a valve housing, a pilot chamber, a main valve member, a control valve member and a pilot valve member. The valve housing comprises a first and a second port. The pilot chamber is in fluid communication with the first and/or second port, wherein a pilot pressure is defined by a hydraulic pressure in the pilot chamber. The main valve member is axially movably arranged in the valve housing and is arranged to interact with a main valve seat of the valve housing in order to restrict or regulate a pressure in a main fluid flow between the first and second ports in response to the pilot pressure acting on the main valve member. The control valve member is axially movable within the main valve member in response to an actuating force acting on the control valve member. The pilot valve member is axially movable within the control valve member, and is arranged to interact with a pilot valve seat of the main valve member or the valve housing to restrict a pilot fluid flow out from the pilot chamber. The pilot valve member is resiliently loaded towards the pilot valve seat relative the control valve member, such that the resilient loading on the pilot valve member (and thereby also the pilot restriction) is adjustable in response to the actuating force.

In other words, the restriction on the pilot fluid flow out from the pilot chamber is adjusted by providing a control valve member arranged to interact with the pilot valve member to adjust the pretension or resilient loading on the pilot valve member in response to an actuating force acting on the control valve member.

The invention is based on the insight that by applying an actuating force to adjust a pretension or resilient loading on the pilot valve instead of using the actuating force to directly adjust a flow restriction area of the pilot valve, improved control or regulation of the pilot pressure may be achieved. Thus, by using a control valve member to adjust a pretension or pre-load on the pilot valve member, a pilot valve of the pressure regulating type is obtained, thereby improving control or regulation of the pilot pressure. The choking effect of a pilot spool valve arrangement (having a fixed maximum flow restriction area) for control of the pilot pressure may thus be reduced or avoided. Another advantage with direct adjustment or control of the pretension or pre-load is that a self-regulating adaptation of the pilot valve due to varying temperatures may be achieved. Yet another advantage is that during higher flows or piston speeds, a sensitive and responsive pilot valve function is achieved.

It is understood that the actuating force is provided in at least an axial direction. It is also understood that the resilient loading on the pilot valve member also has a resilient loading effect on the control valve member. This resilient loading effect counteracts the actuating force. This may be advantageous when the actuating force is provided by an actuating arrangement providing an actuating force solely in one direction, e.g. a solenoid-based actuating arrangement. The resilient loading on the pilot valve member may be achieved by a biasing spring arrangement arranged to resiliently load the pilot valve member towards the pilot valve seat. The biasing spring arrangement may comprise a biasing spring member arranged between the pilot valve member and the main valve member or the valve housing (in embodiments of the first aspect of the invention), or alternatively between the pilot valve member and the control valve member (in embodiments of the second aspect of the invention). The biasing spring member may be arranged at least partially within the control valve member.

According to an embodiment of the first or second aspect of the present invention, the valve arrangement further comprises an intermediate pilot valve member arranged between the pilot valve seat and the pilot valve member. The intermediate pilot valve member may be resiliently loaded towards the pilot valve member in a direction away from the pilot valve seat. The intermediate pilot valve member will thus act on the pilot valve member to prevent or reduce closing of the pilot valve. The intermediate pilot valve member may be flexible or deflectable in the axial direction and may be disc or plate shaped. Such an intermediate pilot valve member may also be described as a shim or a plurality of shims stacked on top of each other. It is understood that a flexible or deflectable pilot valve member refers to a washer-type valve member having a bending or flexural rigidity to deflect when acted upon by the hydraulic pressure in the valve arrangement, e.g. valve member punched or etched out of a sheet of spring steel.

The pilot valve seat may have a greater radial extent than the pilot valve member. The pilot valve seat may be defined by an annular valve seat having a diameter greater than the outer diameter of pilot valve member. The difference in radial extent or diameter defines a differential area achieving a pressure feedback effect between the two sides of the intermediate pilot valve member, i.e. between the pressures up-stream and down-stream of the pilot restriction. Due to the differential area, the pressure up-stream of the pilot restriction will act on a larger area on the intermediate pilot valve compared to the pressure down-stream. The pressure feedback will thus have little effect when there is little difference between the pressures up- and down-stream of the pilot restriction, i.e. when the pilot restriction achieves little restriction on the pilot fluid flow. In this case, the pressure feedback will act to force the intermediate pilot valve member away from the pilot valve seat to open the pilot restriction. When the pressure up-stream is substantially greater than the pressure down-stream of the pilot restriction, the closing pressure force of the pilot pressure will dominate, and the pressure feedback will have its greatest effect.

According to another embodiment of the first or second aspect of the present invention, the intermediate pilot valve member comprises a through hole for fluid communication therethrough, for example with the pilot chamber. This is advantageous because essentially the same pressure acts on both sides of the intermediate pilot valve member, thereby reducing the amount of unwanted forces acting on the intermediate pilot valve member due to pressure differences over the intermediate pilot valve member.

According to yet another embodiment of the first or second aspect of the present invention, the control valve member comprises a first bypass valve portion, the first bypass valve portion being arranged to interact with a second bypass valve portion of the main valve member to define a bypass restriction on a bypass flow bypassing the main fluid flow between the first and second ports, wherein the bypass restriction is adjustable in response to the actuating force.

According to yet another embodiment of the first or second aspect of the present invention, the second bypass valve portion comprises an inner edge of said main valve member. The inner edge may be an edge of a groove or recess in the main valve member. The groove or recess may be in fluid communication with the second port. The groove may be an annular groove which may extend around the periphery of the control valve member.

According to yet another embodiment of the first or second aspect of the present invention, the first bypass valve portion comprises an edge of a recess in said control valve member. The recess may comprise a groove or an annular groove. It is understood that the recess or groove is a formed in an envelope surface of the control valve member. The control valve member may be essentially cylinder shaped. The recess or groove has an axial extension. The recess may be one or a plurality of radial holes bored in the envelope surface of the control valve member. The first bypass valve portion may be formed near an axial end of the control valve member to allow a short flow path between the first bypass flow and the pilot chamber.

According to yet another embodiment of the first or second aspect of the present invention, the first bypass valve portion comprises a lower edge portion of the control valve member. In other words, the first bypass valve portion comprises the edge of the lower end of the control valve member.

According to yet another embodiment of the first or second aspect of the present invention, the main valve member comprises a first lifting surface area arranged to axially separate the main valve member from the main valve seat in response to a hydraulic pressure in the first port, and a second lifting surface area arranged to axially separate the main valve member from the main valve seat in response to a hydraulic pressure in the second port. In other words, the main valve member may comprise a first lifting surface having a radial extent such that the pressure of the hydraulic fluid in the first port acts on the first lifting surface to exert a pressure lifting force on the main valve member. Correspondingly, the second lifting surface may have a radial extent such that the pressure of the hydraulic fluid in the second port acts on the second lifting surface to exert a pressure lifting force on the main valve member. Having such first and second lifting surfaces is advantageous since the main valve member may restrict or adjust a pressure in the main fluid flow in both directions, i.e. either from the first port to the second port or from the second port to the first port.

According to yet another embodiment of the first or second aspect of the present invention, the valve arrangement may comprise a first one-way valve arranged to allow fluid flow solely in the direction from the second pilot valve portion to the first port, and a second one-way valve arranged to allow fluid flow solely in the direction from the second pilot valve portion to the second port such that the pilot fluid flow flows from the pilot chamber to the port in which the hydraulic pressure is the lowest. In other words, a first one-way valve is arranged between the outlet of the pilot valve or restriction and the first port, and a second one-way valve is arranged between the outlet of the pilot valve or restriction and the second port. The first and second one-way valves together form a reverse valve which directs the flow from the pilot chamber to the port in which the hydraulic pressure is the lowest. The first and second one-way valves may be arranged in or on the main valve member and may be in fluid communication with the first and second ports, respectively, via flow passages in said main valve member. The first and second one-way valves may be of the ball check valve type.

According to yet another embodiment of the first or second aspect of the present invention, the valve arrangement may comprise a third one-way valve arranged to allow hydraulic fluid flow solely in the direction from the first port to the pilot chamber, and a fourth one-way valve arranged to allow hydraulic fluid flow solely in the direction from the second port to the pilot chamber. The third and fourth one-way valves may be arranged in or on the main valve member and may be in fluid communication with the first and second ports, respectively, via flow passages in said main valve member. The third and fourth one-way valves may be arranged to allow essentially unrestricted flow there through, such that the pilot chamber contains hydraulic fluid with essentially the same pressure as in the first or second port. The third and fourth one-way valves may thus act as inlet valves to the pilot chamber to allow essentially unrestricted flow of hydraulic fluid into the pilot chamber. The third and fourth one-way valves may comprise a flexible or deflectable disc- or plate shaped valve member interacting with flow openings in or through the main valve member.

According to yet another embodiment of the first or second aspect of the present invention, the pilot valve member comprises an axial through hole for fluid communication there through, for example with the pilot chamber. This may be advantageous because essentially the same pressure acts on both axial ends of the pilot and control valve members, thereby reducing the amount of unwanted forces acting on the pilot and control valve members due to pressure differences there over.

According to yet another embodiment of the first or second aspect of the present invention, a damping space formed between the main valve member, the control valve member and the pilot valve member defines a damping volume being sealed from the first and second ports. The damping volume is in fluid communication with the pilot chamber via the through hole of the pilot valve member. The through hole may have a cross-section to allow essentially unrestricted fluid flow between the damping volume and the pilot chamber. This may be advantageous because essentially the same pressure acts on both sides of the control valve member, thereby reducing the amount of forces acting on the control valve member due to pressure differences over the control valve member. Because the damping volume is sealed from the first and second ports, the inlet of hydraulic fluid to the pilot chamber passes via a flow passage through for example the main valve member or the valve housing, i.e. not through the pilot or control valve member.

According to yet another embodiment of the first or second aspect of the present invention, the pilot valve member comprises a damping flow restriction arranged to restrict fluid flow between the damping volume and the pilot chamber such that relative movement between the main valve member and the control valve member is hydraulically damped. Alternatively, the through hole in the intermediate pilot valve member may have an effective flow area to form a damping flow restriction arranged to restrict fluid flow between the damping volume and the pilot chamber such that relative movement between the main valve member and the control valve member is hydraulically damped.

According to yet another embodiment of the first or second aspect of the present invention, the valve arrangement further comprises a failsafe spring arrangement arranged to resiliently load the control valve member relative the main valve member or valve housing in an opposite direction to the actuating force. The failsafe spring arrangement may be arranged to axially move or force the control member to a failsafe position when no actuating force is received, in which failsafe position the pilot restriction is closed and the bypass restriction is partially open to achieve a predetermined restriction on the bypass fluid flow. It is understood that the case when no actuating force is received refers to when there is electrical or mechanical malfunction to the actuating system. The failsafe spring arrangement may be arranged to resiliently load the control valve member solely when no actuating force is received. The failsafe spring arrangement may comprise the biasing spring member (as described above). The failsafe spring arrangement may alternatively comprise a failsafe spring member, an axially movable spring base member and a pilot spring member, where the failsafe spring member and the pilot spring member are arranged in series with the spring base member there between. The spring stiffness of the failsafe spring member may be lower than the stiffness of the pilot spring member. The spring stiffness of the failsafe spring member may be chosen such that the spring base member is inoperable during normal operation, i.e. when an actuating force is received. For example, the spring base member may rest against the main valve member during normal operation, and may be released from the main valve member during failsafe operation, i.e. when no actuating force is received. Consequently, during failsafe operation, the failsafe spring member and the pilot spring member act together (in series) to force the control valve member to the failsafe position.

According to yet another embodiment of the first or second aspect of the present invention, the main valve member interacts with the main valve seat to form a down-stream restrictor and an up-stream restrictor in view of the main fluid flow, the down-stream restrictor having a larger radial extent or diameter than the up-stream restrictor, thereby varying their restriction on the main fluid flow differently from each other in response to the pilot pressure acting on the main valve member. In other words, the restrictions of the down-stream restrictor and the up-stream restrictor vary differently from each other for a given stroke of the main valve member. It is understood that the main fluid flow flows from the first port via the up-stream restrictor and thereafter via the down-stream restrictor to the second port. The down-stream restrictor may be arranged to achieve great influence upon the size of the restrictor function with small strokes and less influence or shut-off effect with large strokes, and the up-stream restrictor may be arranged to achieve little influence upon the size of the restrictor function with small strokes and greater influence upon the last-named size with large strokes. Such a configuration may be achieved by arranging the up-stream restrictor to be partially open and the down-stream restrictor to be fully closed when the main valve member rests against the main valve seat. This embodiment is advantageous because the two series-connected (down- and up-stream) restrictors may be used together to form a restrictor function in the valve arrangement in question to achieve a smooth flow restriction characteristics in at least the introductory and concluding part of the opening and closing function respectively by mutually altering their restrictor sizes, preferably successively, in dependence upon the present stroke size. It is understood that this embodiment is preferably used for valve arrangements for one-way flows only.

According to yet another embodiment of the first or second aspect of the present invention, the main valve member may comprise an annular groove to form first and second annular portions. The first annular portion of the main valve member is arranged to interact with the main valve seat to form the up-stream restrictor. The second annular portion of the main valve member is arranged to interact with the main valve seat to form the down-stream restrictor. Alternatively, the main valve member may comprise an annular groove to form first and second annular portions, and the main valve seat may comprise an annular groove to form first and second annular valve seat portions. The first annular portion of the main valve member may be arranged to interact with the first annular seat portion to form the up-stream restrictor. The second annular portion of the main valve member is arranged to interact with the second annular seat portion to form the down-stream restrictor. This embodiment achieves two areas which are dependent upon the size of the respective stroke and define directly area-related outer and inner restrictors. When stroke sizes are small, the outer restrictor is smaller in size (i.e. it has greater influence upon the process in question) than the inner restrictor. As stroke sizes increase, the inner restrictor is smaller in size (i.e. it has greater influence upon the process in question) than the outer restrictor. The said change in the sizes of the restrictors has the effect that an intermediate pressure which arises between the restrictors successively diminishes or increases during a respective first and second part of the opening and closing function respectively. The moving main valve member works with two pressure areas, the differential area of which can be acted upon by the said intermediate pressure to create a force which forms the basis of a smooth curve shape in connection with the introductory or concluding part of the opening and closing function respectively.

According to yet another embodiment of the first or second aspect of the present invention, the main valve member comprises an axial through hole having a circular cross-section. Furthermore, the control valve member may be essentially cylinder shaped and may have corresponding dimensions as the through hole of the main valve member, allowing the control valve member to be axially movably arranged at least partly therein and being radially guided. The control valve member may comprise an axial through hole having a circular cross-section. The pilot valve member may be essentially cylinder shaped and may have corresponding dimensions as the through hole of the control valve member, allowing the pilot valve member to be axially movably arranged at least partly therein and being radially guided. The main valve member, the control valve member and the pilot valve member may thus be coaxially arranged with each other.

BRIEF DESCRIPTION OF THE DRAWINGS

Further details and aspect of the present invention will become apparent from the following detailed description with reference to accompanying drawings, in which.

DETAILED DESCRIPTION OF EMBODIMENTS

The present invention will now further be described in connection with the accompanying drawings.

Figure 1:
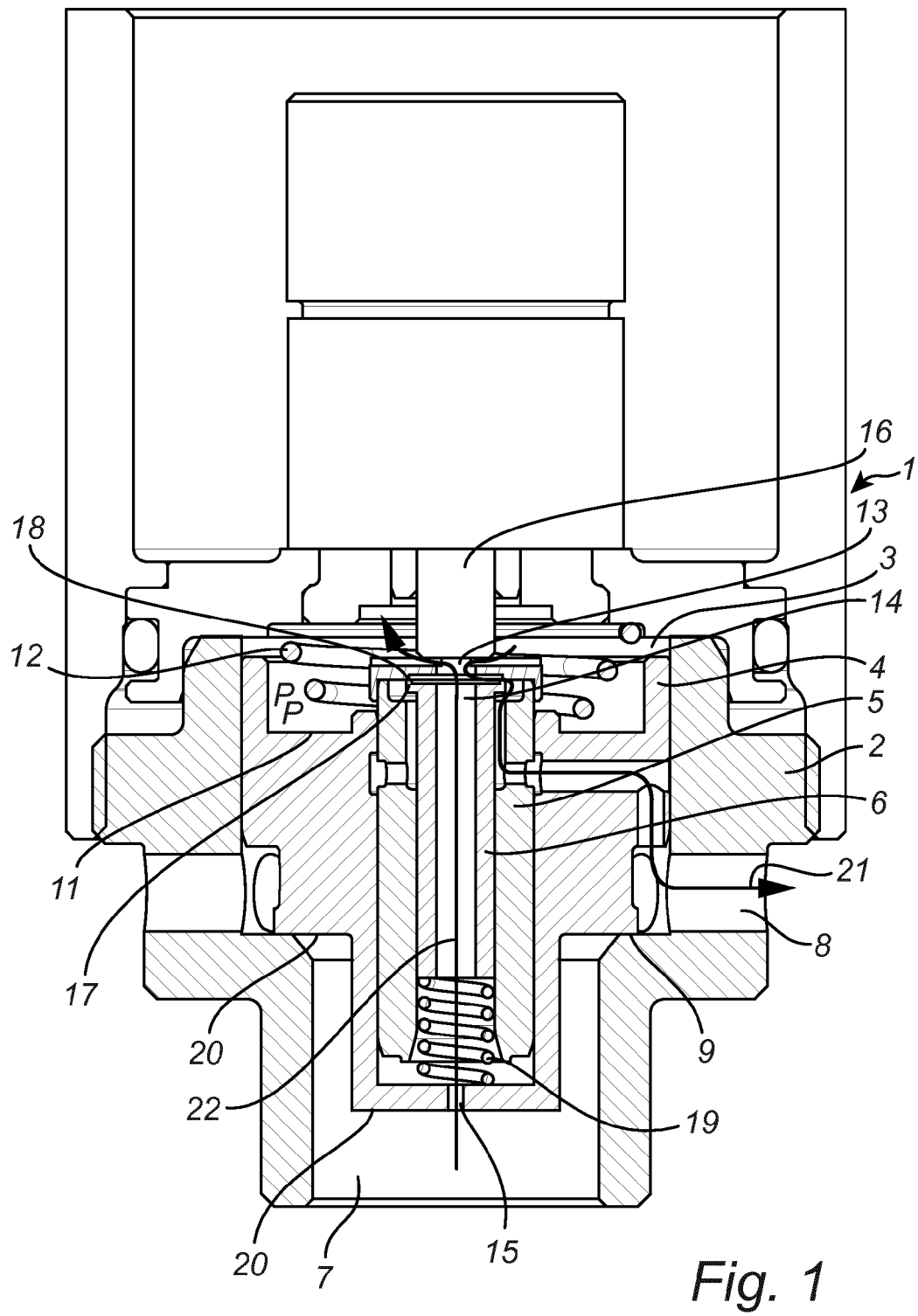
FIG. 1 shows a first embodiment of a valve arrangement according to the first aspect of the present invention.

FIG. 1 shows a first embodiment of a valve arrangement according to the first aspect of the present invention. The valve arrangement 1 comprises a valve housing 2, a pilot chamber 3, a main valve member 4, a control valve member 5 and a pilot valve member 6. The valve housing 2 comprises a first and a second port 7, 8. In the first embodiment, the first and second ports act as inlet and outlet ports, respectively, for inlet and outlet of hydraulic fluid. The main valve member 4 is axially movably arranged in the valve housing 2 and is arranged to interact with a main valve seat 9 of the valve housing in order to restrict (or regulate a pressure) in a main fluid flow 10 from the first port 7 to the second port 8 in response to a pilot pressure Pp acting on an upper surface 11 of the main valve member. In this embodiment, the main valve member 4 is resiliently loaded towards the main valve seat to a closed position by a main helical spring member 12 acting on the upper surface 11 of the main valve member. In other embodiments, the main valve member may be resiliently loaded by other types of spring members or may be flexible and/or resilient itself to achieve the desired resilient loading.

The pilot chamber 3 is defined by the space formed between the upper surface 11 of the main valve member, the upper surface of the control valve member 5 and inner walls of the valve housing 2. The pilot chamber 3 is in fluid communication with the first port 7 via a through hole 13 in an upper portion of the control valve member 4, and via an axial through hole 14 in the pilot valve member 6 and an axial through hole 15 in a bottom portion of the main valve member 4. The pilot pressure Pp acting on the upper surface 11 of the main valve member 4 is defined by a hydraulic pressure in the pilot chamber 3. The through holes 13 and 14 also results in that essentially the same pressure acts on the axial end surfaces of both the control valve member 5 and the pilot valve member 6, thereby eliminating the need for the actuating force to overcome a force resulting from pressure differences over the pilot and control valve members. The axial through hole 15 may have a relatively small cross-section such that it acts as a flow restricting orifice to limit the inflow of hydraulic fluid from the first port 7 to the space formed between the lower end of the control valve member 5 and the inner surface of the cup-shaped lower end of the main valve member 4. This may dynamically reduce the pressure difference over the control valve member.

The control valve member 5 is of a substantially cylindrical shape and is arranged coaxially with and partially within the main valve member, and extends above the upper surface 11 into the pilot chamber 3. The control valve member 5 is furthermore movable in an axial direction relative the main valve member in response to an actuating force acting on the control valve member. In this embodiment, the actuating force is received by an actuating rod 16. The actuating rod may be an axially movable magnetic member on which a solenoid exerts a force in response to an electric current.

The pilot valve member 6 is substantially cylindrical in shape and is axially movable within the control valve member relative the main valve member 4 and relative the control valve member 5. The upper end of the pilot valve member comprises a radially extending flange portion 17 which is arranged to interact with an annular pilot valve seat 18 of the control valve member to restrict a pilot fluid flow 21 out from the pilot chamber to the second port 8. The flange portion 17 and the pilot valve seat have corresponding diameters. The pilot valve member 6 is resiliently loaded towards the pilot valve seat relative said main valve member by a biasing spring member 19. Since the pilot valve seat 18 is a portion of the control valve member 5, the pre-tension on the resilient loading on the pilot valve member is adjustable by axial movement of the control valve member 5 in response to the actuating force.

The pilot pressure Pp is thus determined by a balance between the incoming fluid flow 22 from the first port 7 to the pilot chamber 3 and the outgoing pilot fluid flow 21 from the pilot chamber to the second port 8, the latter being determined by the pilot restriction. The pilot pressure Pp will act on the upper end of the pilot valve member to exert a downwardly directed pressure force which will act to open the pilot valve. The effective flow area of the pilot restriction is determined by the stroke of the pilot valve member relative the pilot valve seat. This stroke is determined by a balance between the pressure force and the counteracting spring force from the biasing spring member 19. The pilot restriction is thus of the pressure-regulating type. As mentioned above, the pre-tension of the biasing spring member is adjustable in response to the actuating force.

In FIG. 1, the hydraulic pressure in the first port acting on the bottom surface 20 of the main valve member 4 is not sufficient to overcome the opposing forces of the main helical spring member 12 and the pilot pressure Pp acting on the main valve member. This may be the case when the speed is low such that the hydraulic pressure in the working chamber of the shock absorber coupled to the first port is also low. The main valve member is thus in a closed position, i.e. in abutment with the main valve seat 9 to block the main fluid flow from the first port to the second port. However, a pilot fluid flow 21 does flow from the pilot chamber to the second port via the pilot restriction.

Figure 2:
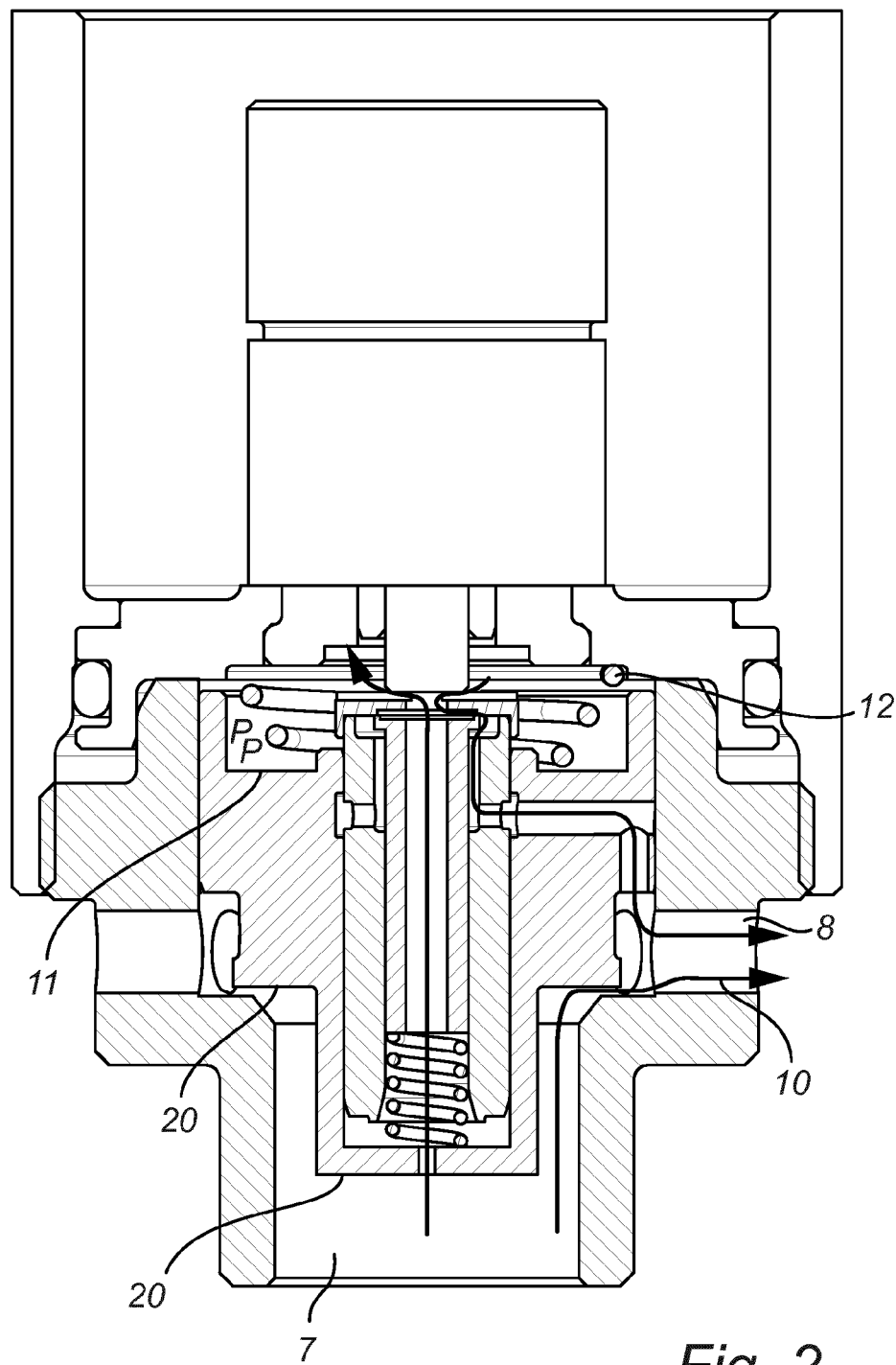
FIG. 2 shows the first embodiment when the main valve member is in an open position to allow a main fluid flow from the first port to the second port.

FIG. 2 shows the first embodiment when the main valve member is in an open position to allow a main fluid flow 10 from the first port 7 to the second port 8. In this case, the hydraulic pressure in the first port acting on the bottom surface 20 of the main valve member is sufficient to overcome the opposing forces of the main helical spring member 12 and the pilot pressure Pp acting on the upper surface 11 of the main valve member. The restriction on the main fluid flow is adjustable by adjusting the pilot pressure by adjusting the restriction on the pilot fluid flow from the pilot chamber to the second port. This adjustment is achieved by adjusting the actuating force acting on the control valve member. The restriction of the main fluid flow 10 is thus of the pressure regulating type.

Figure 3:
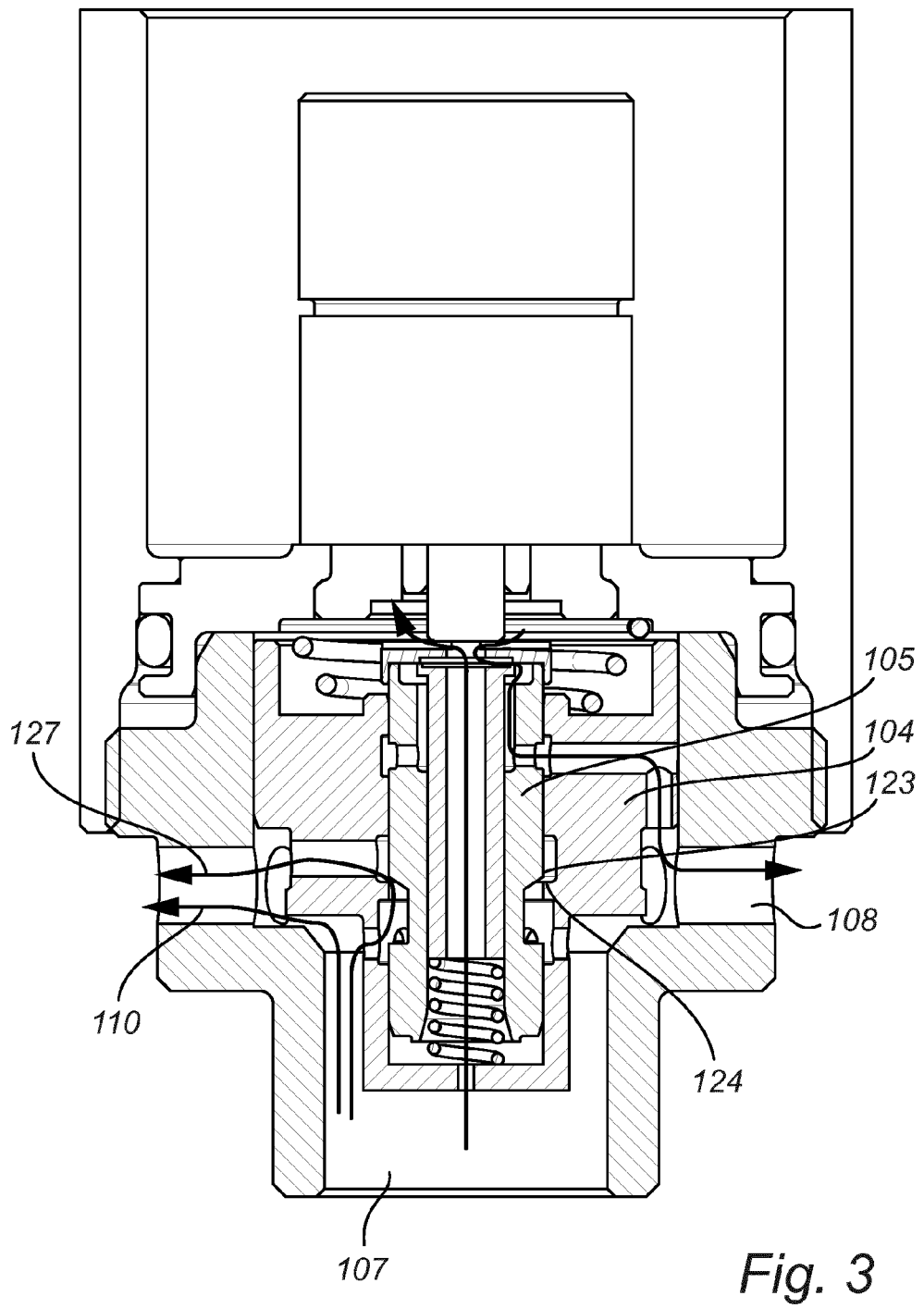
FIG. 3 shows a second embodiment of a valve arrangement according to the first aspect of the present invention, in which embodiment a bypass restriction is provided.

FIG. 3 shows a second embodiment of a valve arrangement according to the first aspect of the present invention. The second embodiment differs from the first embodiment in that a bypass restriction on a bypass fluid flow 127 bypassing the main fluid flow 110 is provided.

The control valve member 105 comprises a first bypass valve portion 123 in the form of an edge of an annular groove in the envelope surface of the control valve member. The main valve member 104 comprises a second bypass valve portion 124 in the form of an inner edge of an annular groove in the main valve member. The first bypass valve portion 123 is arranged to interact with the second bypass valve portion 124 of the main valve member 104 to define a bypass restriction on a bypass fluid flow 127 from the first port 107 to the second port 108. The bypass fluid flow bypasses the main fluid flow 110. When the control valve member 105 moves axially in response to the actuating force, the overlap between the grooves in the control valve member and in the main valve member (the edges of which form the first and second bypass valve portions) varies, thereby adjusting the effective flow restriction area on the bypass fluid flow 127.

Figure 4:
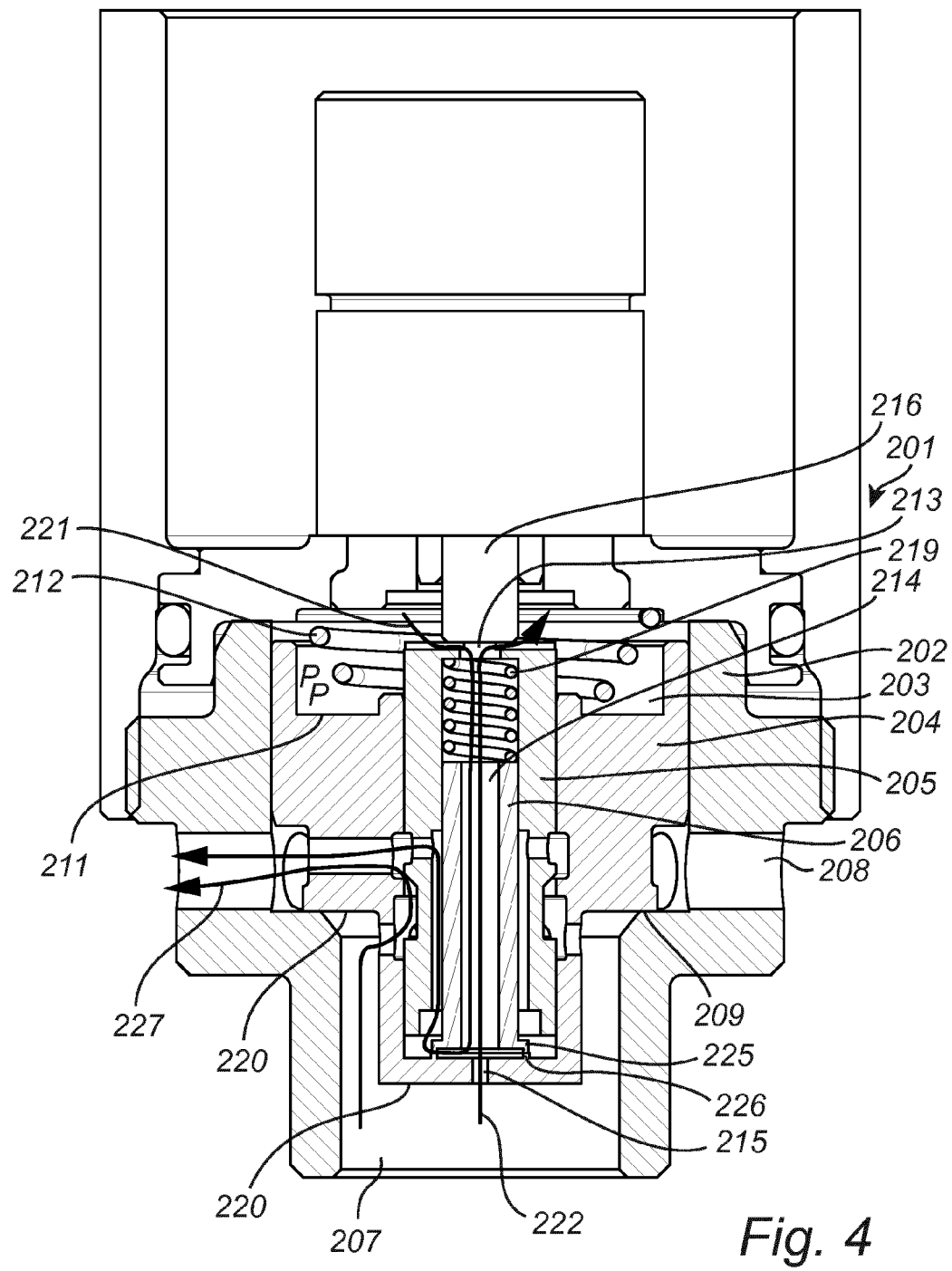
FIG. 4 shows an embodiment of a valve arrangement according to the second aspect of the present invention.

FIG. 4 shows an embodiment of a valve arrangement according to the second aspect of the present invention. The valve arrangement 201 comprises a valve housing 202, a pilot chamber 203, a main valve member 204, a control valve member 205 and a pilot valve member 206. The valve housing 202 comprises a first and a second port 207, 208. The first and second ports act as inlet and outlet ports, respectively, for inlet and outlet of hydraulic fluid. The main valve member 204 is axially movably arranged in the valve housing 202 and is arranged to interact with a main valve seat 209 of the valve housing in order to restrict (or regulate a pressure) in a main fluid flow from the first port 207 to the second port 208 in response to a pilot pressure Pp acting on an upper surface 211 of the main valve member. In this embodiment, the main valve member 204 is resiliently loaded towards the main valve seat to a closed position by a main helical spring member 212 acting on the upper surface 211 of the main valve member. In other embodiments, the main valve member may be resiliently loaded by other types of spring members or may be flexible and/or resilient itself to achieve the desired resilient loading.

The pilot chamber 203 is defined by the space formed between the upper surface 211 of the main valve member, the upper surface of the control valve member 205 and inner walls of the valve housing 202. The pilot chamber 203 is in fluid communication with the first port 207 via a through hole 213 in an upper portion of the control valve member 204, and via an axial through hole 214 in the pilot valve member 206 and an axial through hole 215 in a bottom portion of the main valve member 204. The pilot pressure Pp acting on the upper surface 211 of the main valve member 204 is defined by a hydraulic pressure in the pilot chamber 203. The through holes 213 and 214 also result in that essentially the same pressure acts on the axial end surfaces of both the control valve member 205 and the pilot valve member 206, thereby eliminating the need for the actuating force to overcome a force resulting from pressure differences over the pilot and control valve members.

The control valve member 205 is of a substantially cylindrical shape and is arranged coaxially with and partially within the main valve member, and extends above the upper surface 211 into the pilot chamber 203. The control valve member 205 is furthermore movable in an axial direction relative the main valve member in response to an actuating force acting on the control valve member. In this embodiment, the actuating force is received by an actuating rod 216. The actuating rod may be an axially movable magnetic member on which a solenoid exerts a force in response to an electric current.

The pilot valve member 206 is substantially cylindrical in shape and is axially movable within the control valve member relative the main valve member 204 and relative the control valve member 205.

The lower end of the pilot valve member comprises a radially extending flange portion 225 which is arranged to interact with an annular pilot valve seat 226 of the main valve member to restrict a pilot fluid flow 221 out from the pilot chamber to the second port 208. The flange portion 225 and the pilot valve seat have corresponding diameters. The pilot valve member 206 is resiliently loaded towards the pilot valve seat relative the control valve member by a biasing spring member 219. Since the biasing spring member is arranged between the control valve member 205 and the pilot valve member 206, the pre-tension on the resilient loading on the pilot valve member is adjustable by axial movement of the control valve member 205 in response to the actuating force.

The pilot pressure Pp is thus determined by a balance between the incoming fluid flow 222 from the first port 207 to the pilot chamber 203 and the outgoing pilot fluid flow 221 from the pilot chamber to the second port 208, the latter being determined by the pilot restriction. The pilot pressure Pp will act on the lower end of the pilot valve member to exert an upwardly directed pressure force which will act to open the pilot valve. The effective flow area of the pilot restriction is determined by the stroke of the pilot valve member relative the pilot valve seat 226. This stroke is determined by a balance between the pressure force and the counteracting spring force from the biasing spring member 219. The pilot restriction is thus of the pressure-regulating type. As mentioned above, the pre-tension of the biasing spring member is adjustable in response to the actuating force.

In FIG. 4, the hydraulic pressure in the first port acting on the bottom surface 220 of the main valve member 204 is not sufficient to overcome the opposing forces of the main helical spring member 212 and the pilot pressure Pp acting on the main valve member. This may be the case when the speed is low such that the hydraulic pressure in the working chamber of the shock absorber coupled to the first port is also low. The main valve member is thus in a closed position, i.e. in abutment with the main valve seat 209 to block the main fluid flow from the first port to the second port. However, a pilot fluid flow 221 does flow from the pilot chamber to the second port via the pilot restriction, and a bypass fluid flow 227 flows from the first to the second port.

Figure 5:
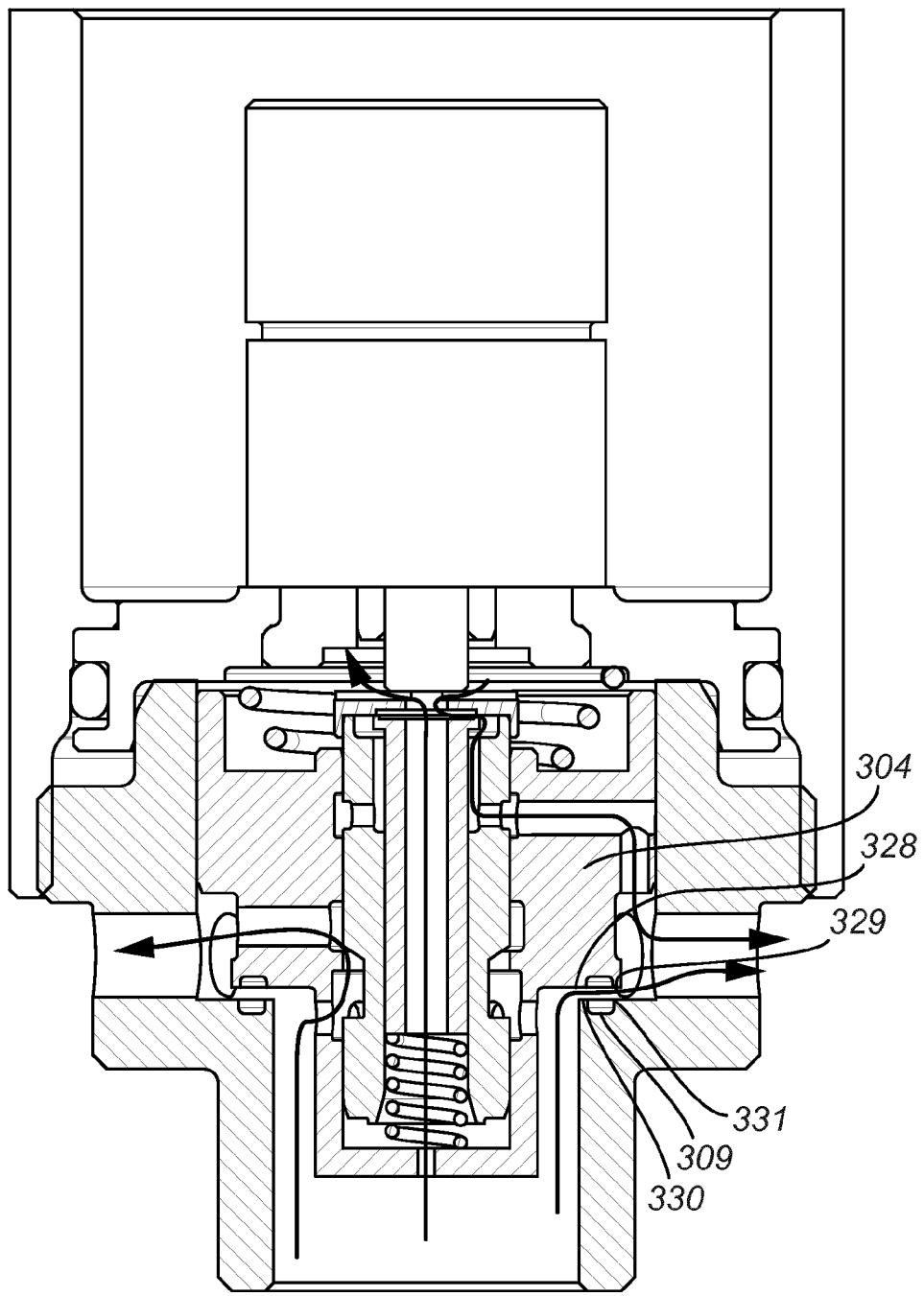
FIG. 5 shows a third embodiment of a valve arrangement according to the first aspect of the present invention.

FIG. 5 shows a third embodiment of a valve arrangement according to the first aspect to the present invention. The portion of the main valve member 304 which faces towards the main valve seat 309 has an annular groove to form first and second annular portions 328, 329. The main valve seat 309 has an annular groove in the surface facing the main valve member 304 to form first and second annular valve seat portions 330, 331. The first annular portion 328 of the main valve member has a diameter corresponding to that of the first annular seat portion 330 to form an up-stream restriction on the main fluid flow 310. The second annular portion 329 of the main valve member has a diameter corresponding to that of second annular seat portion 331 to form a down-stream restriction on the main fluid flow 310. Because the down-stream restriction and up-stream restriction have different diameters, their restriction on the main fluid flow varies differently from each other for a given stroke of the main valve member, i.e. varies differently in response to a given pilot pressure acting on the main valve member. In other words, for a given stroke of the main valve member, i.e. a given lifting distance between the main valve member and the main valve seat, the up-stream restriction provides a smaller effective flow restriction area, i.e. a greater restriction on the flow, than the down-stream restriction.

Figure 6:
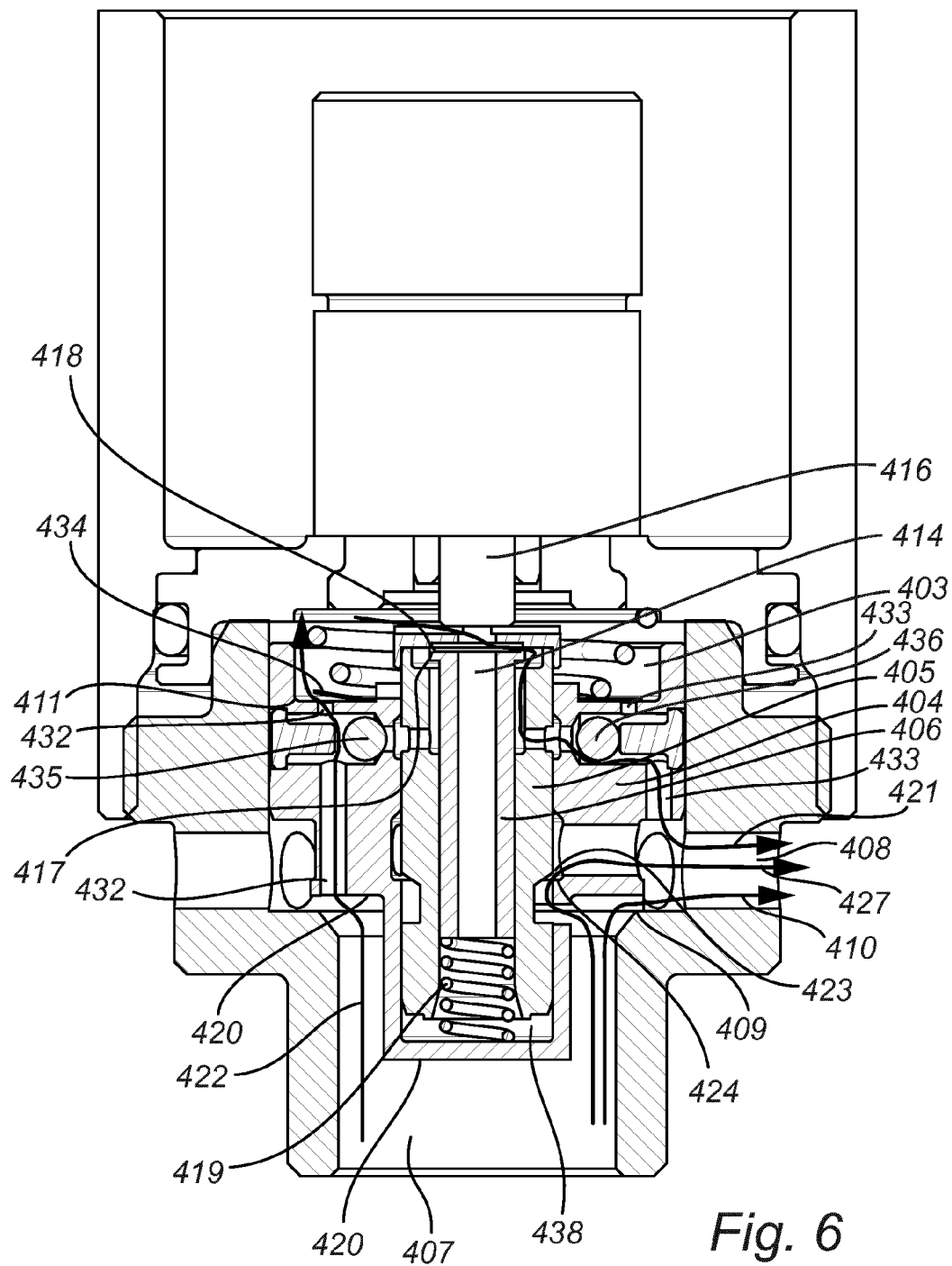
FIG. 6 shows a fourth embodiment of a valve arrangement according to the first aspect of the present invention, where a flow direction from the first port to the second port is illustrated.
Figure 7:
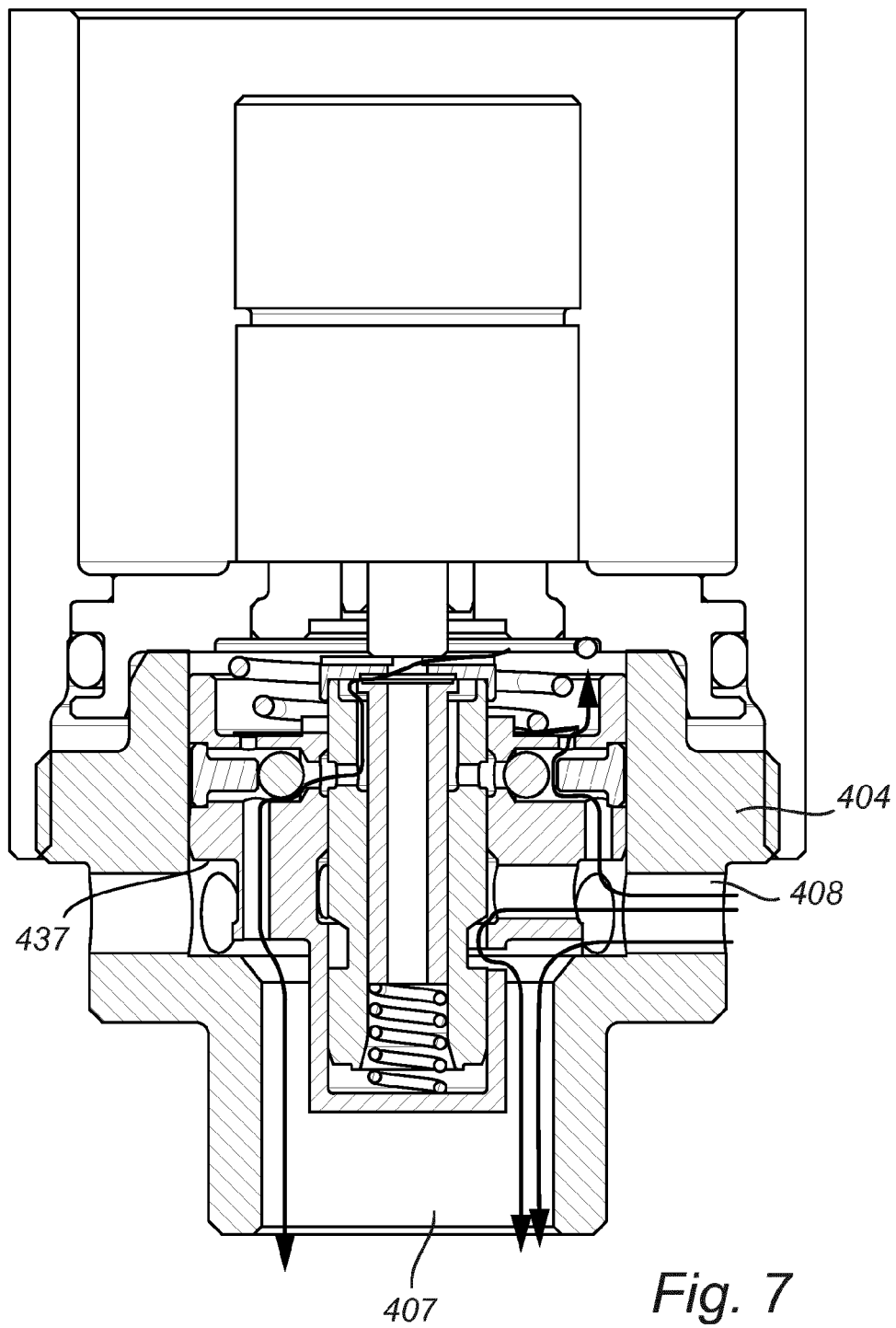
FIG. 7 shows the fourth embodiment where a flow direction from the second port to the first port is illustrated.

FIGS. 6 and 7 show a fourth embodiment of a valve arrangement according to the first aspect of the present invention, in which the valve arrangement is configured for restricting fluid flows in both directions between the first and second ports. In FIG. 6, a flow direction from the first port 407 to the second port 408 is illustrated, and in FIG. 7, a flow direction from the second port to the first port is illustrated. The valve arrangement 1 comprises a valve housing 402, a pilot chamber 403, a main valve member 404 and a control valve member 405. The valve housing 402 comprises a first and a second port 407, 408. In the fourth embodiment, the first and second ports act alternately as inlet and outlet ports for inlet and outlet of hydraulic fluid. The main valve member 403 is axially movably arranged in the valve housing 402 and is arranged to interact with a main valve seat 409 of the valve housing in order to restrict (or regulate a pressure) in a main fluid flow 410 between the first and second ports 407, 408 in response to a pilot pressure acting on an upper surface 411 of the main valve member. The main valve member 404 is resiliently loaded towards the main valve seat towards a closed position by a main helical spring member 412 acting on the upper surface 10 of the main valve member.

The pilot chamber 403 is defined by the space formed between the upper surface 411 of the main valve member and inner walls of the valve housing 402. The pilot chamber 403 is in fluid communication with the first port 407 via a first axial through hole 432 in the main valve member 404 and with the second port 407 via a second axial through hole 433 in the main valve member 404. A disc- or plate-shaped one-way valve member 434 which is flexible or deflectable in the axial direction is arranged on the upper surface 411 of the main valve member to cover the axial through holes 432 and 433, thereby forming a third one-way valve to allow hydraulic fluid flow through the first axial through hole 432 solely in the direction from the first port to the pilot chamber, and a fourth one-way valve to allow hydraulic fluid flow through the second axial through hole 432 solely in the direction from the second port to the pilot chamber. The pilot pressure acting on the upper surface 411 of the main valve member 404 is defined by a hydraulic pressure in the pilot chamber 403. In other embodiments, the one-way valves may be of another type, for example of the ball-valve type.

The control valve member 405 is of a substantially cylindrical shape and is arranged coaxially with and partially within the main valve member 404, and extends above the upper surface 411 into the pilot chamber 403. The control valve member 405 is furthermore movable in an axial direction relative the main valve member in response to an actuating force acting on the control valve member. In this embodiment, the actuating force is received by an actuating rod 416. The actuating rod may be an axially movable magnetic member on which a solenoid exerts a force in response to an electric current.

The pilot valve member 406 is substantially cylindrical in shape and is axially movable within the control valve member relative the main valve member 404 and relative the control valve member 405. The upper end of the pilot valve member comprises a radially extending flange portion 417 which is arranged to interact with an annular pilot valve seat 418 of the control valve member to restrict a pilot fluid flow 421 out from the pilot chamber. The flange portion 417 and the pilot valve seat have corresponding diameters. The pilot valve member 406 is resiliently loaded towards the pilot valve seat relative said main valve member by a biasing spring member 419. Since the pilot valve seat 418 is a portion of the control valve member 405, the pre-tension on the resilient loading on the pilot valve member is adjustable by axial movement of the control valve member 405 in response to the actuating force.

The pilot pressure Pp is thus determined by a balance between the incoming fluid flow 422 from the first port 407 to the pilot chamber 403 and the outgoing pilot fluid flow 421 from the pilot chamber to the second port 408, the latter being determined by the pilot restriction. The pilot pressure Pp will act on the upper end of the pilot valve member to exert a downwardly directed pressure force which will act to open the pilot valve. The effective flow area of the pilot restriction is determined by the stroke of the pilot valve member relative the pilot valve seat. This stroke is determined by a balance between the pressure force and the counteracting spring force from the biasing spring member 419. The pilot restriction is thus of the pressure-regulating type. As mentioned above, the pre-tension of the biasing spring member is adjustable in response to the actuating force.

The control valve member 405 comprises a first bypass valve portion 423 in the form of an edge of an annular groove in the envelope surface of the control valve member. The main valve member 404 comprises a second bypass valve portion 424 in the form of an inner edge of an annular groove in the main valve member. The first bypass valve portion 423 is arranged to interact with the second bypass valve portion 424 of the main valve member 404 to define a bi-directional bypass restriction on a bypass fluid flow 427 between the first and second ports 407, 408. The bypass fluid flow bypasses the main fluid flow 410. When the control valve member 405 moves axially in response to the actuating force, overlap between the grooves in the control valve member and in the main valve member (the edges of which form the first and second bypass valve portions) varies, thereby adjusting the effective flow restriction area on the bypass fluid flow 427.

A first one-way valve 435 of the ball-valve type is arranged in the flow path between the pilot restriction and the first axial through hole 432 to allow fluid flow solely in the direction from the pilot valve to the first port. A second one-way valve 436 of the ball-valve type is arranged in the flow path between the pilot restriction and the second axial through hole 433 to allow fluid flow solely in the direction from the pilot valve to the second port. The two one-way valves 435, 436 together form a directional valve arrangement ensuring that the pilot fluid flow flows to the port in which the hydraulic pressure is the lowest. In FIG. 6, the pressure in the first port 407 is higher than the pressure in the second port 408, therefore the first one-way valve 435 is closed to prevent pilot fluid flow from the pilot chamber 403 to the first port 407, while the second one-way valve 436 is open to allow pilot fluid flow from the pilot chamber 403 to the second port 408. It is understood that the ball of the first one-way valve is held in closed position by the pressure difference over the pilot restriction, and that the ball of the second one-way valve is moved to an open position by the pilot fluid flow. In FIG. 7, pressure in the second port 408 is higher than the pressure in the first port 407, and the one-way valves 435, 436 are in opposite positions compared to in FIG. 6 to allow pilot fluid flow from the pilot chamber 403 to the first port 407. Thus, the two one-way valves work independently of each other, but in response to the same pressures and pressure differences to achieve the desired directional valve functionality.

When the control valve member 405 moves axially in response to the actuating force, the pre-tension on the spring member 419 varies, thereby adjusting the pressure-regulating effect on the pilot fluid flow 421.

Consequently, the pilot pressure may be adjusted by adjusting the actuating force.

The first bypass valve portion 423 is arranged to interact with a second bypass valve portion 424 of the main valve member 404 to define a bypass restriction on a bi-directional bypass fluid flow 427 between the first and the second ports. The bypass fluid flow bypasses the main fluid flow 410. The bypass flow is separate from the pilot flow 421. When the control valve member 405 moves axially in response to the actuating force, the overlap between the grooves in the control valve member and in the main valve member (the edges of which form the first and second bypass valve portions) varies, thereby adjusting the effective flow restriction area on the bypass fluid flow 427.

The bottom surface of the main valve member 404 constitutes a first lifting surface area 420. When a hydraulic pressure in the first port 407 acts on the area 420, and this pressure is sufficient to overcome the pilot pressure Pp acting on the upper surface 411 of the main valve member and the force of the main helical spring member 412, the main valve member 404 is moved axially upwards and is consequently released from the main valve seat to allow a main fluid flow between the main valve member and the main valve seat from the first port to the second port. This case is illustrated in FIG. 6.

The main valve member 404 further comprises a second annular lifting surface area 437. This area is defined by a difference in diameter between an upper and a lower portion of the main valve member. When a hydraulic pressure in the second port 408 acts on the area 437, and this pressure is sufficient to overcome the pilot pressure acting on the opposite side of the main valve member and the force of the main helical spring member 411, the main valve member 404 is moved axially upwards and is consequently released from the main valve seat to allow a main fluid flow between the main valve member and the main valve seat from the second port to the first port. This case is illustrated in FIG. 7.

The space formed between the lower end of the control valve member 405 and the inner surface of the cup-shaped lower end of the main valve member 404 defines a damping volume 438 being sealed from the first and second ports 407, 408. The pilot valve member 406 has a through hole 414 extending in the axial direction there through for fluid communication between the damping volume 438 and the pilot chamber 403. The axial through hole 414 also results in that essentially the same pressure acts on both axial end surfaces of the pilot and control valve members, thereby eliminating the need for the actuating force to overcome a force resulting from a pressure difference over the control valve member.

Figure 8:
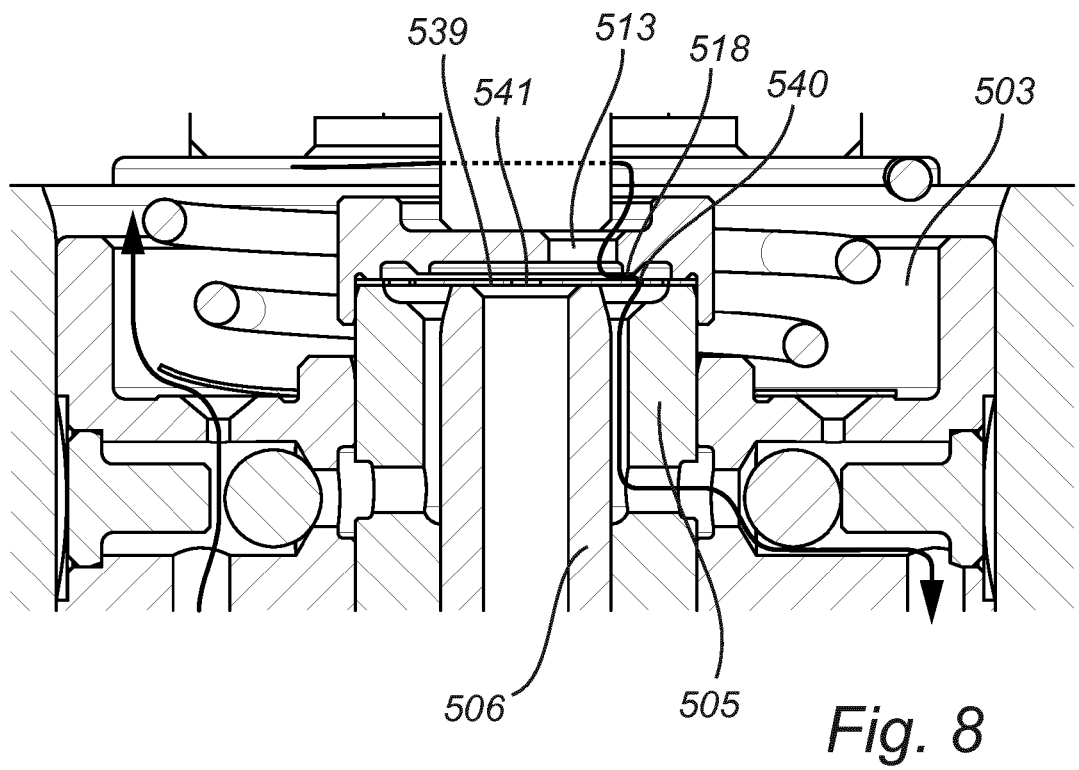
FIG. 8 shows a detailed view of the pilot valve arrangement of a fifth embodiment of a valve arrangement according to the first aspect of the present invention.

FIG. 8 shows a detailed view of the pilot valve arrangement of a fifth embodiment of a valve arrangement according to the first aspect of the present invention. The fifth embodiment differs from the fourth embodiment in that an intermediate pilot valve member 539 is provided between the pilot valve seat 518 and the pilot valve member 506, and in that the pilot valve member has no radially extending flange portion (such that the pilot valve seat has a greater diameter than the pilot valve member). The intermediate pilot valve member 539 is of the shim-type, i.e. a disc-shaped washer which is deflectable in the axial direction. The inherent resilient properties of the intermediate pilot valve member resilient loads the intermediate pilot valve member towards the pilot valve member in a direction away from the pilot valve seat. The intermediate pilot valve member will thus act on the pilot valve member to prevent or reduce closing of the pilot valve. Because the pilot valve seat has a greater diameter than the pilot valve member, a differential area is formed to achieve a pressure feedback effect between the two sides of the intermediate pilot valve member, i.e. between the pressures up-stream and downstream of the pilot restriction. When the pilot restriction is not fully closed, the pilot fluid flow flows from the pilot chamber 503, through the through hole 513 in the upper end of the control valve member 505, between the intermediate pilot valve member 539 and the pilot valve seat 518, through at least one through hole 540 in the intermediate pilot valve member, and thereafter to the first or second port, depending on which has the lowest pressure. The intermediate pilot valve member 539 is furthermore provided with an orifice or through hole 541 to restrict a hydraulic fluid flow there through between the pilot chamber and the damping volume via the through hole in the pilot valve member 506. The orifice or through hole 541 has an effective flow area to form a damping flow restriction arranged to restrict fluid flow between the damping volume and the pilot chamber such that relative movement between the main valve member and the control valve member is hydraulically damped.

Figure 9:
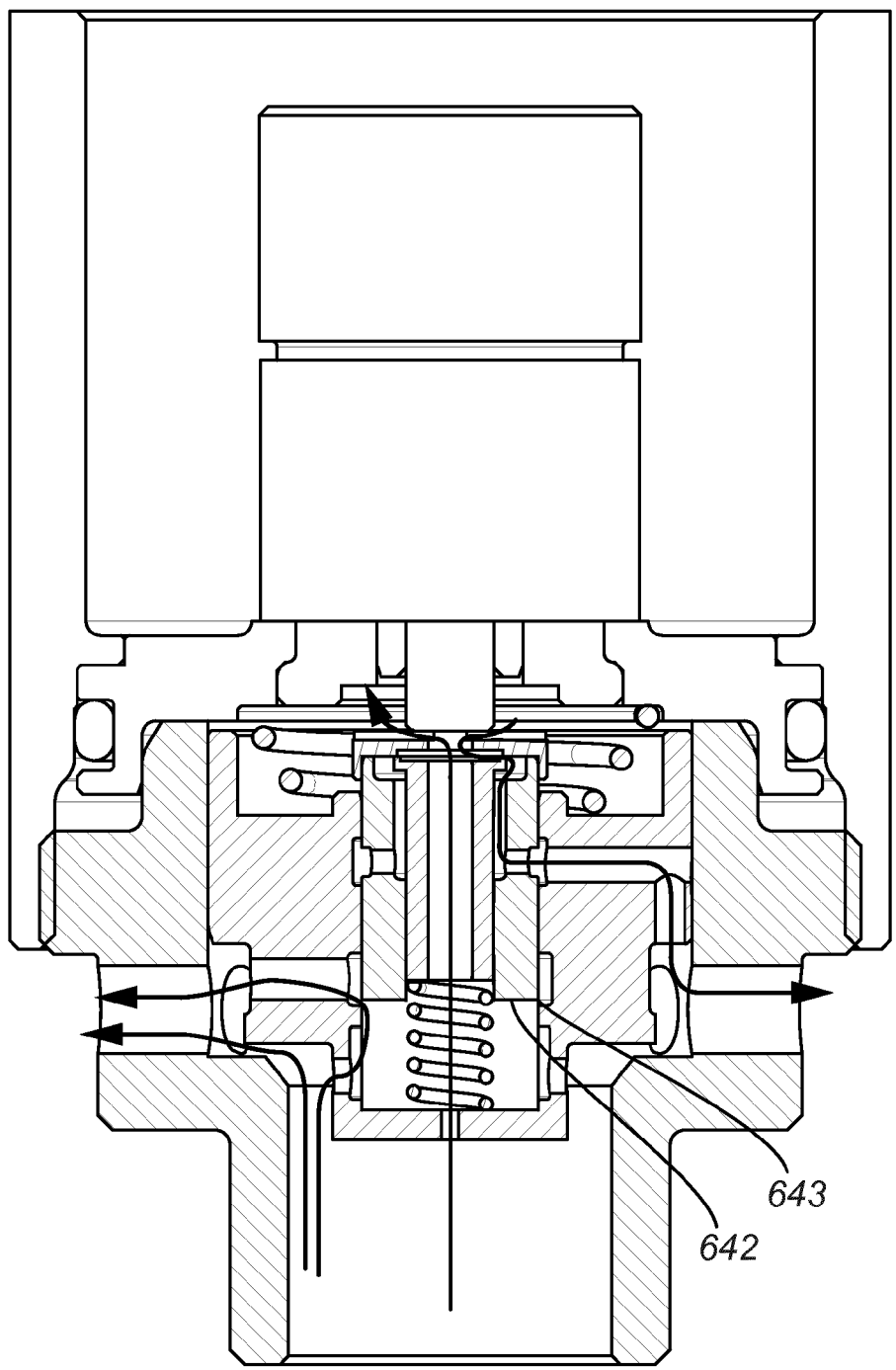
FIG. 9 shows a sixth embodiment of a valve arrangement according to the first aspect of the present invention.

FIG. 9 shows a sixth embodiment of a valve arrangement according to the present invention. The sixth embodiment differs from the second embodiment in that the bypass valve configuration is different. The control valve member has an essentially plane lower end surface portion 642, and the first bypass valve portion comprises an edge 643 of this lower end surface portion.

Figure 10:
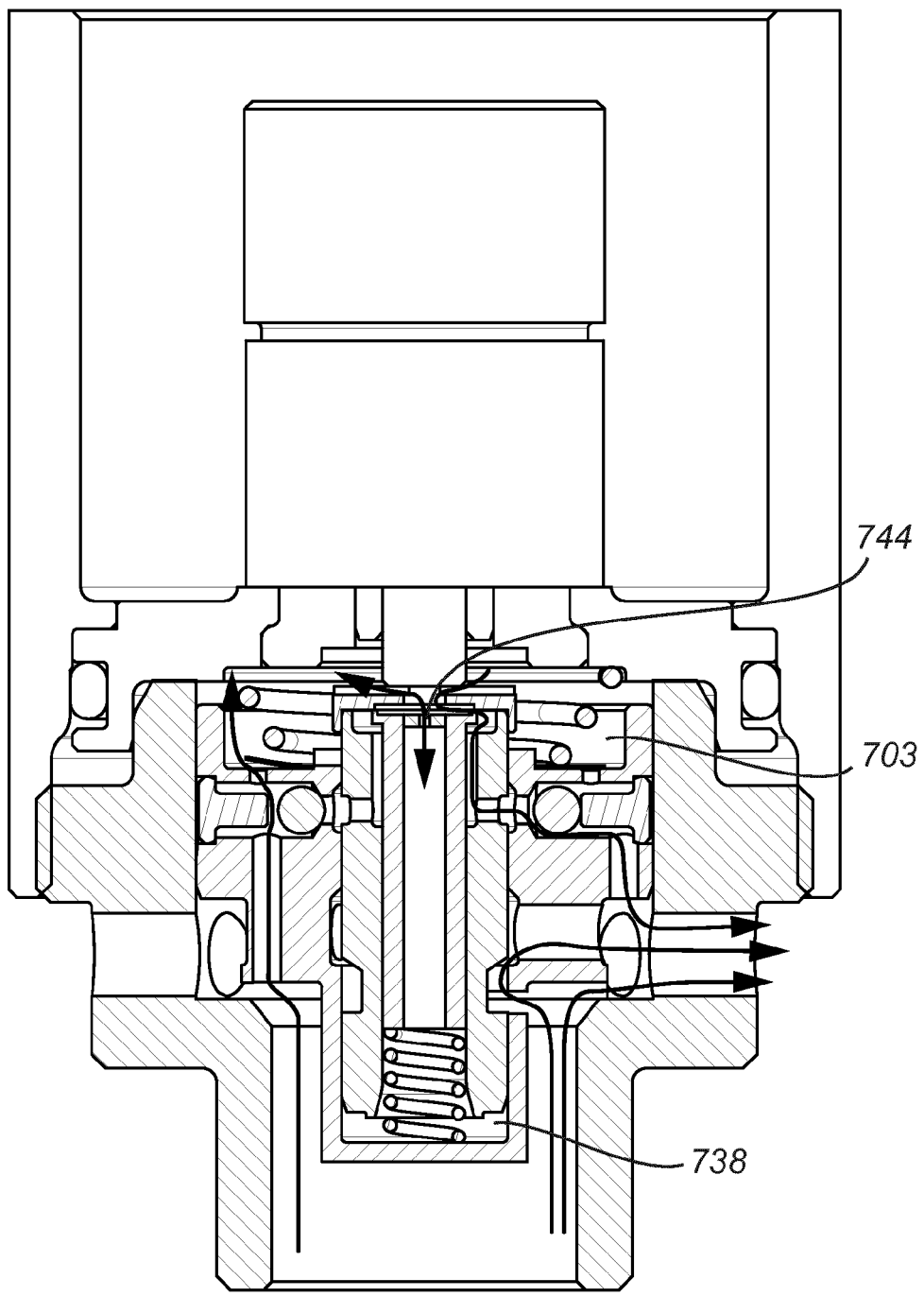
FIG. 10 shows a seventh embodiment of a valve arrangement according to the first aspect of the present invention.

FIG. 10 shows a seventh embodiment of a valve arrangement according to the first aspect of the present invention. The seventh embodiment differs from the fourth embodiment in that the pilot valve member is provided with an orifice 744 in the flow path between the pilot chamber 703 and the damping volume 738. The orifice has a fixed effective flow area to achieve a restriction on the fluid flow between the damping volume and the pilot chamber such that relative movement between the main valve member and the control valve member is hydraulically damped.

Figure 11:
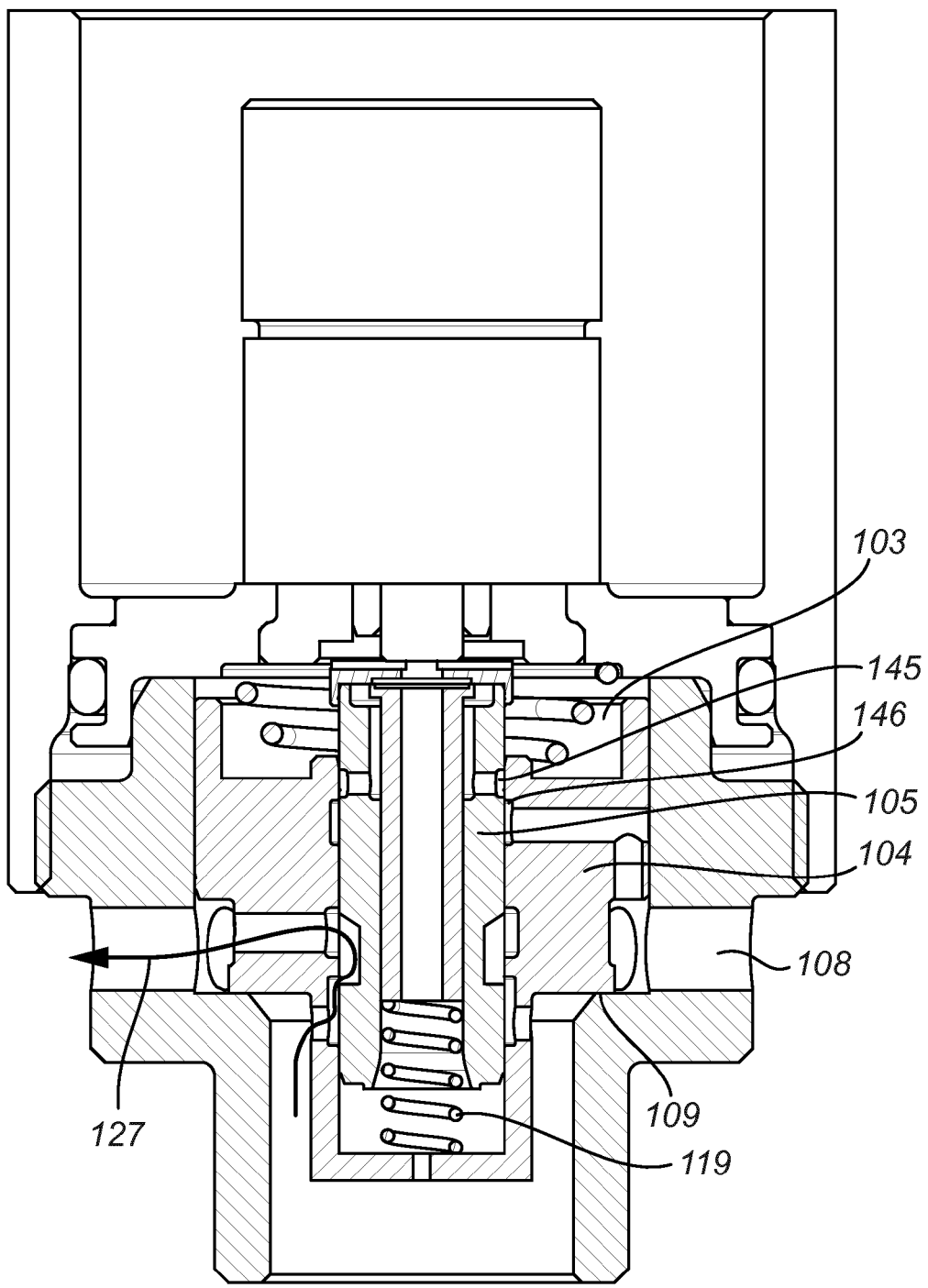
FIG. 11 shows the second embodiment when the control valve member is in a failsafe position.

FIG. 11 shows the second embodiment when the control valve member 105 is in a failsafe position. In the figure, a case when no actuating force is received is illustrated, i.e. for example when there is electrical or mechanical malfunction to the actuating system. Since no actuating force is received, the biasing spring member 119 forces the control member 105 upwards to the illustrated failsafe position, in which failsafe position the flow path from the pilot restriction to the second port 108 is closed and the bypass restriction is partially open to achieve a predetermined restriction on the bypass fluid flow 127. In the failsafe position, the annular grooves 145, 146 in the control valve member and the main valve member are non-overlapping, consequently closing the flow path from the pilot restriction to block any fluid flow out from the pilot chamber. Consequently, hydraulic fluid is prevented from leaving the pilot chamber and the pressure of the hydraulic fluid in the pilot chamber 103 will prevent the main valve member 104 from being released or lifted from the main valve seat 109. In the failsafe position, the overall flow from the first to the second port is thus determined solely by the predetermined restriction on the bypass fluid flow 127 defined by the failsafe position of the control valve member relative the main valve member.

Figure 12:
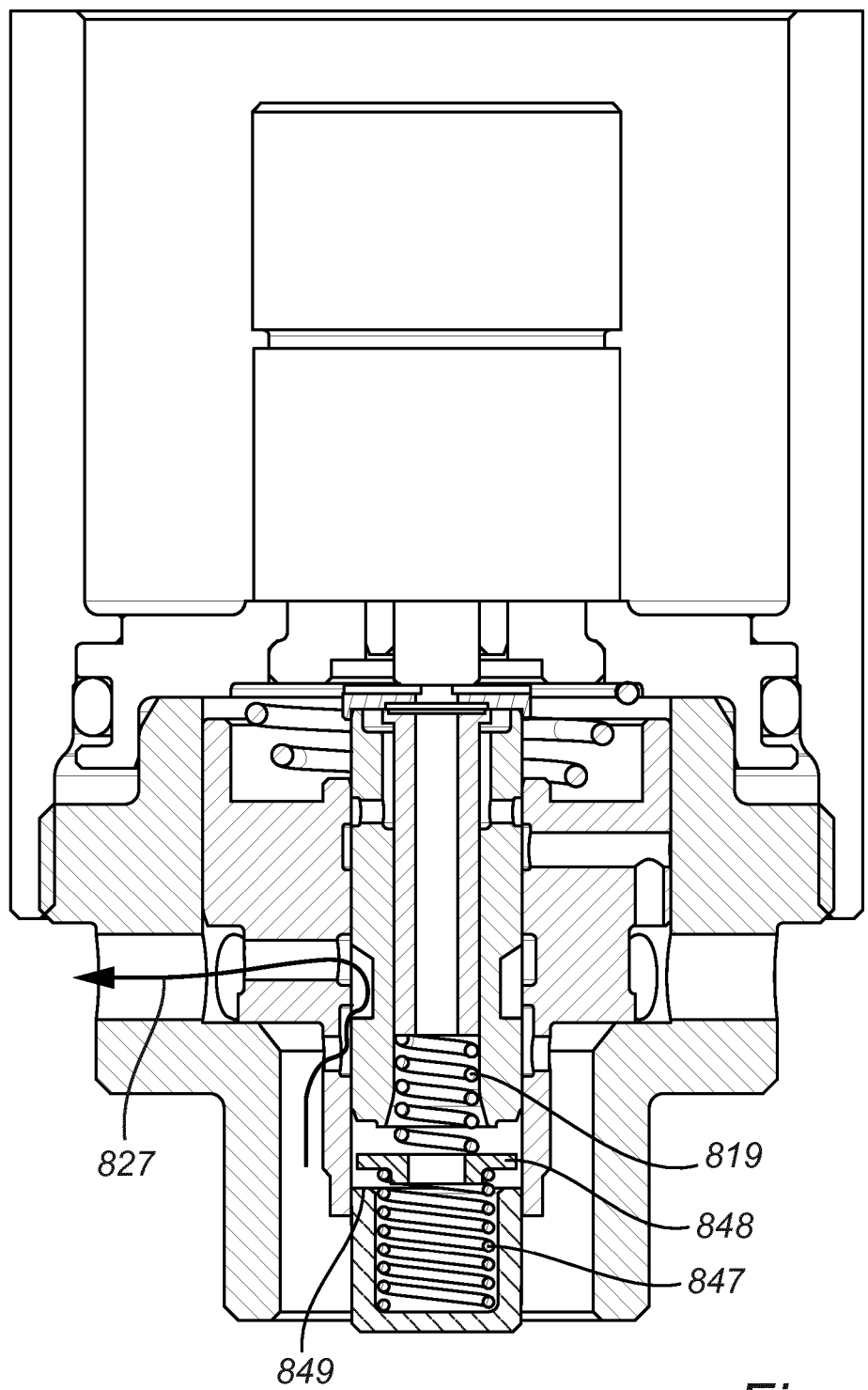
FIG. 12 shows an eighth embodiment of a valve arrangement according to the first aspect of the present invention, when the control valve member is in a failsafe position.

FIG. 12 shows an eighth embodiment of a valve arrangement according to the first aspect of the present invention. The eighth embodiment differs from the second embodiment in that it further comprises a failsafe spring member 847 and an axially movable spring base member 848. The failsafe spring member 847 and the biasing spring member 819 are arranged in series with the spring base member 848 there between. The spring stiffness of the failsafe spring member is lower than the stiffness of the biasing spring member, such that the spring base member is inoperable during normal operation, i.e. when an actuating force is received. The spring base member rests against a seat portion 849 of the main valve member during normal operation, and is released from the main valve member during failsafe operation. During failsafe operation, as illustrated in FIG. 12, the failsafe spring member and the pilot spring member act together in series to force the control valve member to the failsafe position. In the same manner as explained above in connection with FIG. 11, while in the failsafe position, the flow path from the pilot chamber to the second port closed and the bypass restriction is partially open to achieve a predetermined restriction on the bypass fluid flow 827.

Although exemplary embodiments of the present invention have been shown and described, it will be apparent to the person skilled in the art that a number of changes and modifications, or alterations of the invention as described herein may be made. Thus, it is to be understood that the above description of the invention and the accompanying drawing is to be regarded as a non-limiting example thereof and that the scope of the invention is defined in the appended patent claims.

The invention claimed is:

1. A valve arrangement (1) for a shock absorber, said valve arrangement comprising:
   a valve housing (2) comprising a first and a second port (7, 8);
   a pilot chamber (3) being in fluid communication with said first and/or second port, wherein a pilot pressure (Pp) is defined by a hydraulic pressure in said pilot chamber;
   a main valve member (4) axially movably arranged in said valve housing and arranged to interact with a main valve seat (9) of said valve housing in order to restrict a main fluid flow (10) between said first and second ports in response to said pilot pressure acting on said main valve member;
   a control valve member (5) axially movable within said main valve member in response to an actuating force acting on said control valve member;
   a pilot valve member (6) axially movable within said control valve member, said pilot valve member being arranged to interact with a pilot valve seat (17) of said control valve member to restrict a pilot fluid flow (21) out from said pilot chamber;
   wherein said pilot valve member (6) is resiliently loaded towards said pilot valve seat (17) relative said main valve member (4) or said valve housing (2), such that the resilient loading on said pilot valve member is adjustable in response to said actuating force.

2. A valve arrangement (201) for a shock absorber, said valve arrangement comprising:
   a valve housing (202) comprising a first and a second port (207, 208);
   a pilot chamber (203) being in fluid communication with said first and/or second port, wherein a pilot pressure (Pp) is defined by a hydraulic pressure in said pilot chamber;
   a main valve member (204) axially movably arranged in said valve housing (202) and being arranged to interact with a main valve seat (209) of said valve housing in order to restrict a main fluid flow between said first and second ports in response to said pilot pressure acting on said main valve member;
   a control valve member (205) axially movable within said main valve member (204) in response to an actuating force acting on said control valve member;
   a pilot valve member (206) axially movable within said control valve member (205), said pilot valve member being arranged to interact with a pilot valve seat (226) of said main valve member (204) or said valve housing to restrict a pilot fluid flow (221) out from said pilot chamber;
   wherein said pilot valve member is resiliently loaded towards said pilot valve seat relative said control valve member, such that the resilient loading on said pilot valve member is adjustable in response to said actuating force.

3. The valve arrangement according to claim 1, further comprising an intermediate pilot valve member (539) arranged between said pilot valve seat (518) and said pilot valve member (506), wherein said intermediate pilot valve member is resiliently loaded towards said pilot valve member in a direction away from said pilot valve seat.

4. The valve arrangement according to claim 3, wherein said intermediate pilot valve member (539) is flexible and disc or plate shaped.

5. The valve arrangement according to claim 3, wherein said pilot valve seat (518) has a greater radial extent than said pilot valve member (506).

6. The valve arrangement according to claim 3, wherein said intermediate pilot valve member comprises a through hole (541) for fluid communication there through.

7. The valve arrangement according to claim 1, wherein said control valve member (105) comprises a first bypass valve portion (123), said first bypass valve portion being arranged to interact with a second bypass valve portion (124) of said main valve member (104) to define a bypass restriction on a bypass flow (127) between said first and second ports, wherein said bypass restriction is adjustable in response to said actuating force.

8. The valve arrangement according to claim 7, wherein the second bypass valve portion comprises an inner edge (125) of said main valve member.

9. The valve arrangement according to claim 7, wherein the first bypass valve portion comprises an edge (125) of a recess in said control valve member.

10. The valve arrangement according to claim 9, wherein said recess comprises an annular groove.

11. The valve arrangement according to claim 7, wherein the first bypass valve portion comprises a lower edge portion (643) of said control valve member.

12. The valve arrangement according to claim 1, wherein said main valve member (404) comprises a first lifting surface area (420) arranged to axially separate said main valve member from said main valve seat (409) in response to a hydraulic pressure in said first port (407), and a second lifting surface area (437) arranged to axially separate said main valve member from said main valve seat in response to a hydraulic pressure in said second port (408).

13. The valve arrangement according to claim 1, further comprising a first one-way valve (435) arranged to allow fluid flow solely in the direction from said second pilot valve portion to said first port (407), and a second one-way valve (436) arranged to allow fluid flow solely in the direction from said second pilot valve portion to said second port (408).

14. The valve arrangement according to claim 1, further comprising a third one-way valve (434) arranged to allow hydraulic fluid flow solely in the direction from said first port (407) to said pilot chamber (403), and a fourth one-way valve (434) arranged to allow hydraulic fluid flow solely in the direction from said second port to said pilot chamber.

15. The valve arrangement according to claim 1, wherein said pilot valve member comprises an axial through hole (14; 214) for fluid communication there through.

16. The valve arrangement according to claim 15, wherein a damping space formed between said main valve member, the control valve member and the pilot valve member defines a damping volume (438; 738) being sealed from the first and second ports, said volume being in fluid communication with said pilot chamber via said through hole (414; 744) of said pilot valve member.

17. The valve arrangement according to claim 16, wherein said intermediate pilot valve member comprises a through hole (541) for fluid communication there through and wherein said through hole (541) forms a damping flow restriction arranged to restrict fluid flow between said damping volume and said pilot chamber such that relative movement between said main valve member and said control valve member is hydraulically damped.

18. The valve arrangement according to claim 16, wherein said pilot valve member comprises a damping flow restriction (744) arranged to restrict fluid flow between said damping volume (738) and said pilot chamber (703) such that relative movement between said main valve member and said control valve member is hydraulically damped.

19. The valve arrangement according to claim 7, further comprising a failsafe spring arrangement (19) arranged to resiliently load said control valve member in an opposite direction to said actuating force.

20. The valve arrangement according to claim 19, further comprising pilot spring means (819) arranged between said pilot valve member and a spring base member (848), said pilot spring means being arranged to resiliently load said pilot valve member towards said pilot valve seat, said failsafe spring arrangement (847) being arranged to act on said spring base member to resiliently load said control valve member.

21. The valve arrangement according to claim 1, wherein said main valve member (304) interacts with said main valve seat (309) to form a down-stream restrictor (329, 331) and an upstream restrictor (328, 330) in view of said main fluid flow, said downstream restrictor having a larger radial extent than said up-stream restrictor, thereby varying their restriction on the main fluid flow differently from each other in response to said pilot pressure acting on said main valve member.

22. The valve arrangement according to claim 21, wherein said main valve member comprises an annular groove to form first and second annular portions (328, 329), and wherein said main valve seat comprises an annular groove to form first and second annular valve seat portions (330, 331), said first annular portion of said main valve member being arranged to interact with said first annular seat portion to form said upstream restrictor, said second annular portion of said main valve member being arranged to interact with said second annular seat portion to form said down-stream restrictor.

* * * * *